Oct. 7, 1958  H. H. WAGNER  2,854,964
EMERGENCY SHUTDOWN CONTROL FOR INDUSTRIAL ENGINES
Filed Jan. 17, 1957  2 Sheets-Sheet 1
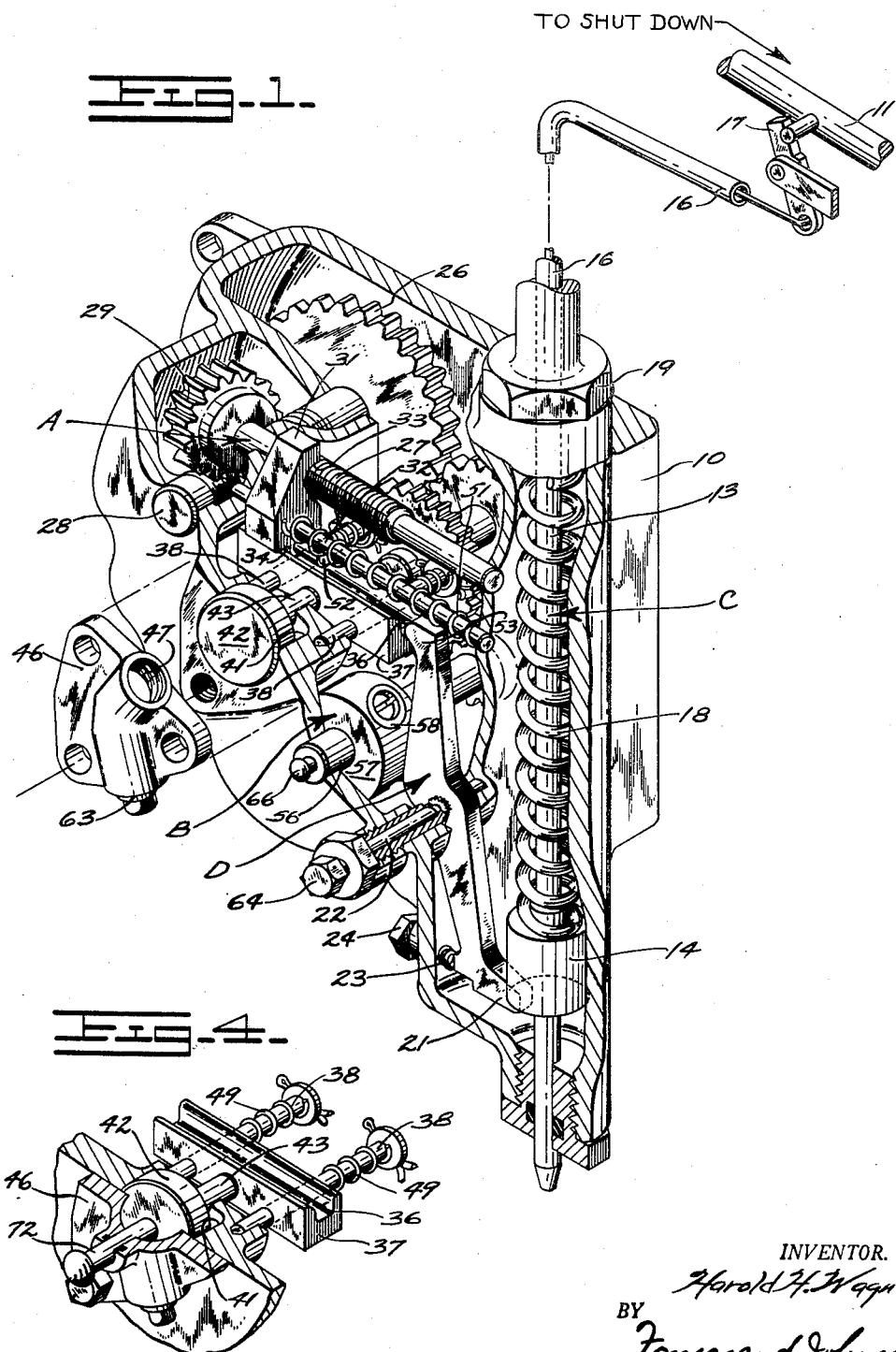
INVENTOR.
Harold H. Wagner
BY
Fryer and Johnson
ATTORNEYS Oct. 7, 1958 — H. H. WAGNER — 2,854,964
EMERGENCY SHUTDOWN CONTROL FOR INDUSTRIAL ENGINES
Filed Jan. 17, 1957 — 2 Sheets-Sheet 2

INVENTOR.
Harold H. Wagner
BY
Fryer and Johnson
ATTORNEYS

# United States Patent Office 2,854,964
Patented Oct. 7, 1958

2,854,964

EMERGENCY SHUTDOWN CONTROL FOR INDUSTRIAL ENGINES

Harold H. Wagner, Peoria, Ill., assignor to Caterpillar Tractor Co., Peoria, Ill., a corporation of California Application January 17, 1957, Serial No. 634,642

7 Claims. (Cl. 123—198)

This invention relates to emergency shutdown controls for internal combustion engines and specifically to a control to shut down an engine in response to an oil pressure failure condition in the lubricating system of the engine or to overspeeding of the engine usually caused by some condition that is not controllable by the engine governor.

The present invention further relates to a safety shutdown device wherein the oil pressure sensing portion thereof includes mechanical means to provide a time delay before shutting down the engine. The period of delay is longer at slow speeds, as for instance in starting attempts, and is shorter at higher engine speeds so as to shut down the engine under either condition, before damage is incurred, when subnormal oil pressure conditions exist in the lubricating system of the engine.

One objection to presently-used hydraulically actuated controls is that a pressure supply of fluid other than the lube oil is necessary in order to maintain the shut off device inactive under normal conditions. In addition to the increased cost of a second pump to supply the secondary pressure, physical obstructions which produce the effect of pressure may simulate a normal and safe condition and allow the engine components to be damaged. Another objection to presently-used controls is that they are automatically reset which, unless prior investigation into the reason for oil pressure failure has been made, may likewise result in damage to the engine components.

Moreover, in presently-used overspeed governors or automatic shut off mechanisms, there is usually a considerable time lag between initial overspeeding and shutting off of the engine so that some damage may be done to the engine before it stops.

It is, therefore, an object of this invention to provide an emergency shutdown control for a diesel engine having a movable member to control fuel supply comprising mechanical means reflecting oil pressure conditions existing in the engine lube system which affords a delay period to permit sufficient time to start the engine without necessitating additional controls to deactivate the oil pressure sensitive portion of the control. Another important object of this invention is to incorporate with such an oil pressure sensing mechanism, mechanical means for actuating a movable control to shut off the fuel supply to the engine under conditions of low oil pressure.

A still further object of this invention is to combine with the above-mentioned components a speed responsive member reflecting the speed conditions of the engine which acts on said mechanical connections to the fuel control member of the engine to stop the engine upon a condition of an excessive speed increase which is not normally controllable by the usual engine governor.

Further and more specific objects and advantages of this invention are made apparent in the following specification wherein a preferred form of the invention is described in detail by reference to the accompanying drawings.

In the drawings:

Fig. 1 is an isometric view of the emergency shutdown control of the present invention with parts broken away to show details of construction;

Fig. 4 is a fragmentary isometric view partially in section illustrating a manual shut off which acts upon the pressure sensitive portion of this control.

Referring to Fig. 1 of the drawings, the emergency shutdown control of the present invention comprises a housing 10 containing mechanical means indicated A for sensing oil pressure conditions in the lubricating system of the engine; mechanical means designated B reflecting the speed conditions at which the engine is operating; a captive plunger C having connections to the fuel control member of the engine herein disclosed in the form of a rack bar 11 of the type associated with the fuel injection pumps of a diesel engine, and a latch mechanism D co-acting with the plunger C which is tripped by either means A or B in response to subnormal oil pressure conditions and overspeeding conditions of the engine respectively.

Figure 3:
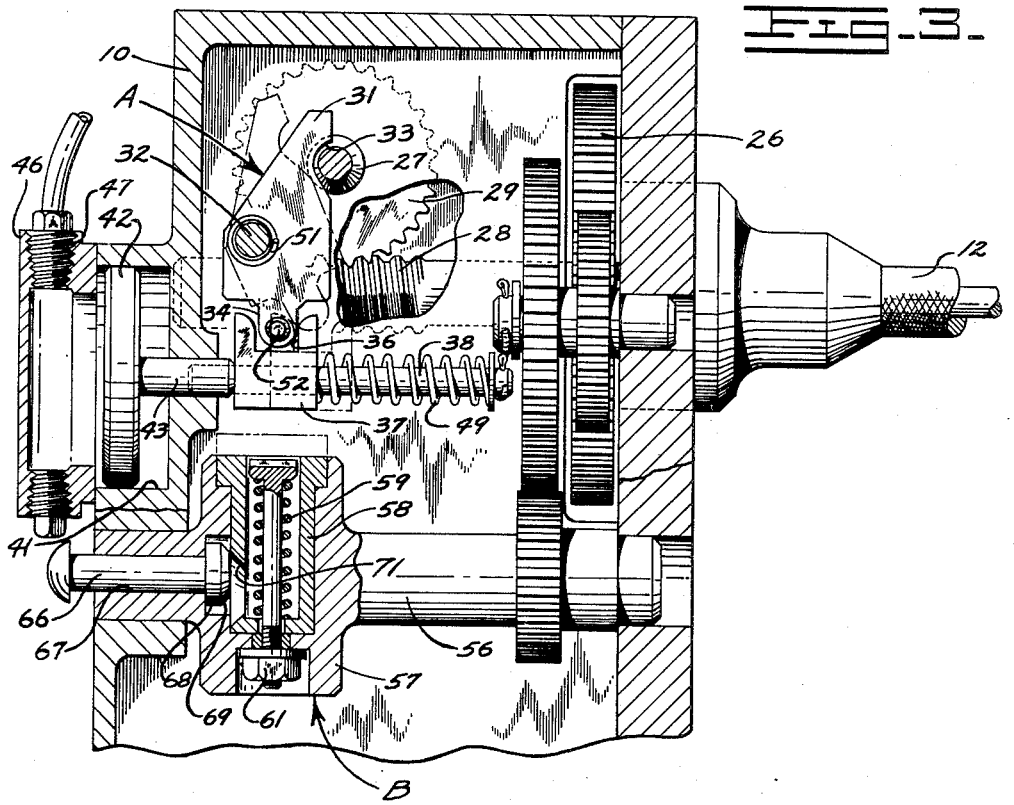
Fig. 3 is a transverse section of the control illustrated in Fig. 1 showing the relationship between the oil pressure sensitive control and the overspeed control of this invention.

As seen in Fig. 3, the emergency shut off control is driven through a power take-off shaft 12 driven by the engine to continuously drive members A and B as will subsequently be described.

The plunger C is retained within housing 10 and comprises a rod 13 having an enlarged flange portion 14. From one end of rod 13 connection is made with the fuel control member 11 by means of a flexible cable 16 to a lever 17 acting to move the rack bar toward the no fuel position upon downward movement of the rod 13. A compression spring 18, acting between flange 14 and a suitable nut 19, is retained under compression by a toe 21 of the latch D. Latch D is fixed to a pin 22 which is free to oscillate so that clockwise movement of the latch swings toe 21 free of the flange 14 permitting rod 13 to move downwardly, as shown in Fig. 1, under the influence of spring 18, to move lever 17 and rack bar 11 in a direction to stop the flow of fuel and shut down the engine.

The latch D may be re-cocked by elevating the plunger C until toe 21 of the latch D underlies flange 14. A spring 23 normally urges the latch toward its engaged position and tension of this spring is adjustable by a screw 24.

As seen in Figs. 1 and 3, control A comprises a gear train 26 driven by shaft 12 that drives a worm and worm wheel 28 and 29 which in turn constantly rotate a lead screw 27 non-rotatably secured to worm wheel 29. A traveling block in the form of a finger 31 slidably retained on a shaft 32, in spaced parallel relation to the screw 27, is provided with an arcuate notch 33 having threads therein that match those of the lead screw 27. Block 31 is further provided with a depending portion 34 which rides in a groove 36 of a block 37, slidably retained on pins 38 secured in the housing 10.

Housing 10 is also provided with a cylindrical chamber 41 and a piston 42 having a rod 43 extending therefrom and contacting the block 37. An adapter 46 closes the chamber 41 so that a line connected to the lube oil system of the engine conducts a flow of lube oil at the pressure existing in the engine to the head of the piston 42 through a suitable connection 47 in the adapter 46 (see also Fig. 3). Engine oil pressure acting on the head end of piston 42 moves the block 37 to the right as seen in Fig. 3 against the compression of springs 49 to impart a counter-clockwise rotation to finger 31 thereby moving it free from engagement with the threads of the lead screw 27. In the event of an oil pressure failure condition, the pressure acting on the head end of the piston 42 drops to a value below the force of the springs 49. With this condition obtaining, the block 37 will be moved to the left as seen in Fig. 3 to cause the finger 31 to engage the threaded lead screw 27 causing finger 31 to move axially along the shaft 32 against the compression of spring 51 on shaft 32. If the subnormal oil pressure condition continues for a length of time sufficient for the finger 31 to traverse the length of screw 27 as determined by the pitch of the threads and the length of the screw as well as the speed at which the screw 27 is rotating, a pin 52 carried with the extension 34 of the finger 31 engages the end of the latch mechanism D imparting clockwise rotative movement to the latch and releasing the plunger by withdrawing the obstruction presented by the toe portion 21 of member D to permit the plunger to move downwardly as seen in Fig. 1. Downward movement of the plunger rod 13 causes the fuel control device 11 to be moved to the no fuel position thereby shutting down the engine before damage is incurred.

The mechanism A functions in effect as a revolution counter whereby at low operating speeds of the engine, as for instance when an engine is being motored, the rate at which the finger 31 traverses the screw 27 is predetermined to allow sufficient time to motor the engine even in the absence of sufficient engine oil pressure to permit starting of the engine under conditions other than ideal without unnecessarily triggering the oil pressure shut off portion of this control. On the other hand, if the condition of subnormal oil pressure persists, the latch member D would be tripped as described above in time to prevent damage to the engine parts.

Figure 2:
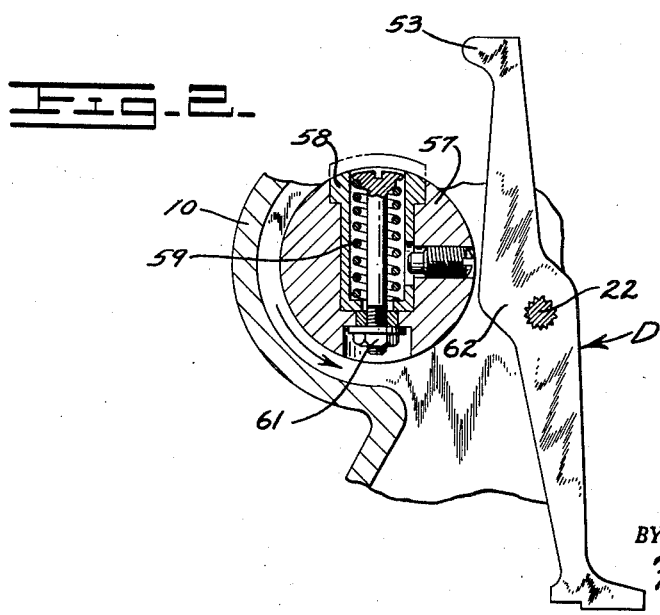
Fig. 2 is a fragmentary sectional view of the overspeed control mechanism wherein the latch member is shown to illustrate its relationship to the overspeed control.

The overspeed control mechanism comprises a shaft 56 driven by the gear train 26 and having an enlarged portion 57 containing a radially disposed weight 58. Under normal speed conditions, the weight 58 is retained within the portion 57 by the force of a spring 59. The preload of spring 59 may be altered by an adjusting nut 61 so that the weight will be forced outwardly by centrifugal force at a predetermined speed. Under conditions of excessive speeds, the weight 58 assumes the position indicated in broken lines in Fig. 2 where it impinges a shoulder 62 on the latch mechanism D to trip the latch and release the plunger and shut down the engine by moving the fuel rack 11 in a manner previously described.

Other shutdown devices such as water temperature controls may also be adapted to this arrangement. Controls of this type usually utilize a thermostat control in the engine cooling system associated with a dump valve in the engine lube system which simulates an oil pressure failure condition and trips the plunger C and shuts down the engine as previously described. In this case a second connection 63 may be provided in the adapter 46 to accommodate this control.

In some instances, it may be desirable to provide a manual control for tripping the latch D. In this event, the shaft 22 fixed to latch member D may be provided with a lever or hexagon head 64 so that a suitable wrench may be applied to manually impart clockwise rotation to the latch member thereby freeing the plunger and shutting down the engine.

A manual shut off control acting on the overspeed portion B may be desired in some cases. In this event as seen in Figs. 1 and 3, a push rod 66 slidably retained within a bore 67, co-axial within the shaft 56, and having an enlarged head 68 on one end, is provided. The head 68 is formed with a taper 69 so that when the plunger 66 is thrust inwardly, the taper 69 engages a matching taper 71 in the wall of the weight 58 thereby moving the weight outwardly in simulation of an overspeed condition. With the weight thrust outwardly in this manner, the latch mechanism will be tripped and the engine shut down as previously described.

It is a preferred practice when an engine shuts down because of subnormal oil pressure to make immediate investigation to determine the cause for this failure in pressure prior to attempting to restart the engine. However, in some instances, where specifications require, a manual reset may be provided for re-cocking the pressure sensitive portion A of this control. As seen in Fig. 4 a simple plunger 72 slidably retained within the adapter 46 may engage the head end of the piston 42 which, under the influence of manual pressure, will swing the finger 31 in a counter-clockwise direction whereby said finger will be returned to its starting position as shown in Fig. 1 under the influence of spring 51, and the oil pressure control A will be cocked without dismantling the oil pressure control.

I claim:

1. In combination with an engine having a movable member to control fuel supply, a spring biased plunger with connections to said fuel control member, a latch restraining said plunger and maintaining said spring stressed under normal operating conditions of the engine, an oil pressure sensitive device, and a mechanical time delay mechanism effective upon a continued subnormal oil pressure condition to trip the latch and shut down the engine by moving said member through said connections.

2. In combination with an engine having a movable member to control fuel supply, a spring biased plunger with connections to said fuel control member, a latch restraining said plunger and maintaining said spring stressed under normal operating conditions of the engine, an oil pressure sensitive device, and a mechanical time delay mechanism effective, upon a continued subnormal oil pressure condition to trip the latch and shut down the engine by moving said member through said connections, and an overspeed member centrifugally acting against said latch to shut down the engine in response to excessive speeds developed by said engine.

3. An emergency shutdown control for an engine having a fuel supply control member comprising, in combination, a spring biased plunger with connections to said control member, a latch restraining said plunger and maintaining said spring stressed under normal operating conditions of said engine, mechanical means driven by said engine, said means comprising a rotating screw and a pivotal finger with a portion engageable with threads of said screw to cause the finger to travel toward said latch to trip the latch and automatically position the control member to shut down the engine under a condition of oil pressure failure.

4. An emergency shutdown control for an engine having a fuel supply control member comprising, in combination, a spring biased plunger with connections to said control member, a latching restraining said plunger and maintaining said spring stressed under normal operating conditions of the engine, mechanical means driven by said engine, said means comprising a rotating screw and a pivotal finger engageable with the screw to be driven thereby toward said latch, said finger having an appendage, a grooved block co-acting with said appendage and slidable in a plane normal to the plane of travel of said finger effective to pivot said finger out of engagement with said screw during a normal oil pressure condition, thereby inactivating the oil pressure sensitive shut-off control.

5. An emergency shutdown control for an engine having a fuel supply control member comprising, in combination, a spring biased plunger with connections to said control member, a latch restraining said plunger and maintaining said spring in compression under normal operating conditions of the engine, mechanical means driven by said engine, said means comprising a rotating screw and a pivotal finger engageable with the screw to be driven thereby toward said latch, said finger having an appendage, a grooved block co-acting with said appendage and slidable in a plane normal to the plane of travel of said finger, a piston acting on said block reflecting the oil pressure condition existing in the engine to slide said block and pivot said finger maintaining it out of engagement with said screw during a normal oil pressure condition, thereby inactivating the oil pressure sensitive shut-off control.

6. An emergency shutdown control for an engine having a fuel supply control member comprising, in combination, a spring biased plunger with connections to said control member, a latch restraining said plunger and maintaining said spring in compression under normal operating conditions of the engine, mechanical means driven by said engine, said means comprising a rotating screw and a pivotal finger engageable therewith to be driven toward said latch, said finger having an appendage, a grooved block co-acting with said appendage and slidble in a plane normal to the plane of travel of said finger, a piston acting on said block reflecting the oil pressure condition existing in the engine to slide said block and pivot said finger maintaining it out of engagement with said screw during a normal oil pressure condition, thereby inactivating the oil pressure sensitive shut-off control, and resilient means opposing the motion influenced by oil pressure to swing said finger in a direction to engage said screw and subsequently shut down the engine by tripping said latch.

7. An emergency shutdown control for an engine having a movable member to control fuel supply including a spring biased plunger with connections for moving said member, means responsive to the oil pressure conditions and means reflecting the speed condition of said engine arranged to release said plunger and shut down the engine wherein said first named means comprises an engine driven lead screw, a block adapted to traverse the length of said screw and move said member to shut down the engine under conditions of oil pressure failure and wherein said second named means comprising a revolving eccentric weight effective to shut down the engine by moving said member under over-speed conditions.

References Cited in the file of this patent

UNITED STATES PATENTS

| | | |
|---|---|---|
| 2,551,429 | Eppens | May 1, 1951 |
| 2,645,474 | Barnes | July 14, 1953 |
| 2,706,025 | Halttunen | Apr. 12, 1955 |
| 2,719,521 | King et al. | Oct. 4, 1955 |
| 2,731,001 | Dickson et al. | Jan. 17, 1956 |